Sept. 1, 1925.
G. WEISS
1,551,718
JUICE EXTRACTOR FOR LEMONS AND THE LIKE
Filed Sept. 8, 1924
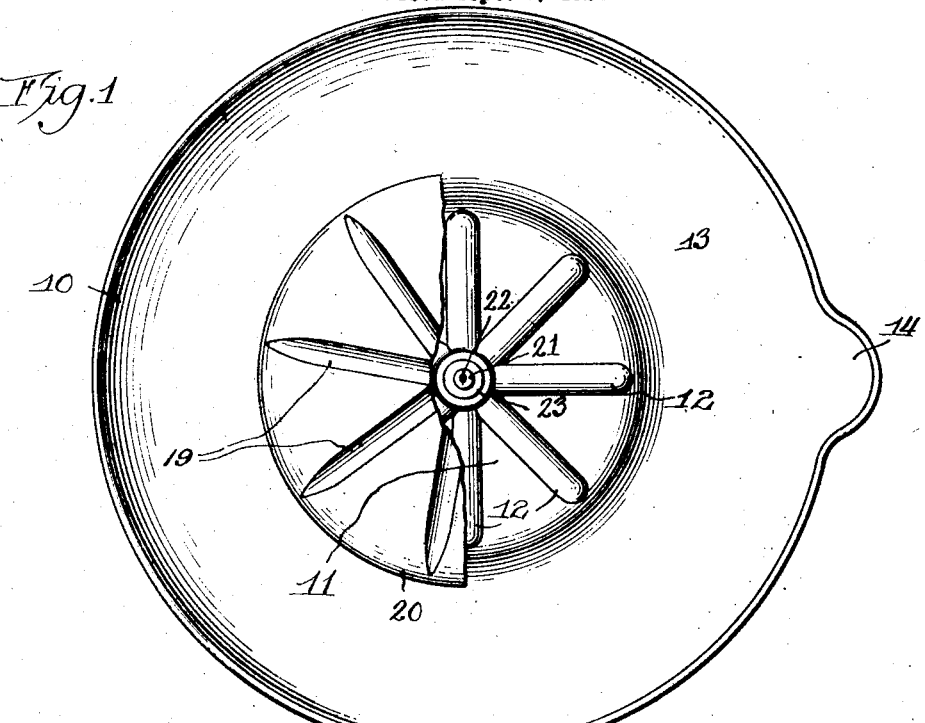
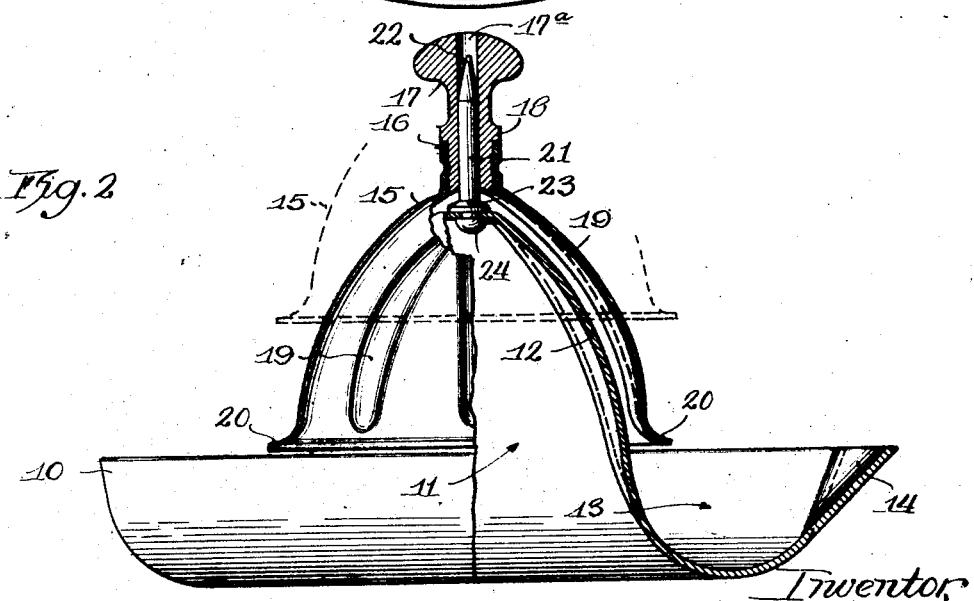
Inventor
George Weiss Patented Sept. 1, 1925.

1,551,718

UNITED STATES PATENT OFFICE.

GEORGE WEISS, OF CHICAGO, ILLINOIS.

JUICE EXTRACTOR FOR LEMONS AND THE LIKE.

Application filed September 8, 1924. Serial No. 736,459.

*To all whom it may concern:*

Be it known that I, GEORGE WEISS, a citizen of the United States, residing at Chicago, in the county of Cook and State of Illinois, have invented certain new and useful Improvements in Juice Extractors for Lemons and the like, of which the following is a specification.

This invention relates to improvements in juice extractors for lemons and the like, and one of the objects of the same is to provide an improved device of this character which will not only be of a sanitary construction but will be efficient and effective in operation and by means of the use of which the juice may be expeditiously extracted or expressed from the article.

A further object is to provide an improved device of this character embodying a member having a portion projecting therefrom which is preferably of a substantially conical formation adapted to extend into the article, and a bell shaped member adapted to engage over the article and the said conical portion so that the article may be pressed therebetween, the said conical portion and the said bell shaped member being axially and freely rotatable or oscillatable one with respect to the other. The article contacting faces of the conical portion and the bell shaped member are preferably provided with grooves or channels extending lengthwise of the respective parts for receiving and conveying away the juice as it is extracted.

A further object is to provide in an improved article of this character a pin or projection adapted to impale or penetrate the article to hold the latter in proper position between the conical projecting portion and the bell shaped member to prevent the article from slipping.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which.

Figure 1 is a top plan view partially broken away, of a device of this character constructed in accordance with the principles of this invention.

Figure 2 is a view partly in vertical section and partly broken away and showing in dotted lines the bell shaped member partially removed.

Referring more particularly to the drawing the numeral 10 designates generally a supporting member having a portion 11 projecting thereabove, preferably of a substantially conical formation and having grooves 12 in the outer face thereof. These grooves preferably extend in directions lengthwise of the portion 11 and preferably terminate adjacent the apex and also at a point spaced above the bottom of such portion.

Any number of such grooves may be provided and they are preferably shaped that they will decrease in depth toward the respective ends of the grooves.

The lower portion or base of the member 10 is shaped to form an open receptacle 13 which is of a diameter considerably greater than the diameter of the conical portion 11 and encompasses the latter. This portion 11 is preferably located centrally of the member 10 and may extend for any distance there above, and the portion of the member 10 which forms the outer wall of the receptacle 13 is preferably shaped to form a lip or spout 14 to assist in pouring out the liquid which is contained within the receptacle.

Co-operating with the portion 11 is a substantially bell shaped member 15 which is of an internal diameter somewhat greater than the external diameter of the conical portion 11. The apex of the bell shaped member 15 is preferably tubular as at 16 and extending into this tubular portion is a knob like member 17 of any desired construction, but is preferably provided with a shoulder 18 which rests against the end of the tubular portion 16. These parts may be secured together in any desired or suitable manner and the element 17 is provided for a purpose to be hereinafter set forth.

If desired the knob 17 may be omitted and in that event the apex of the bell shaped member may be closed.

The body portion of the bell shaped member 15 is provided with a series of grooves 19 extending lengthwise thereof and opening through the inner face of the member. These grooves 19, any number of which may be provided, may be of any desired configuration but are preferably shaped so that their depth will decrease toward the ends thereof. The lower extremities of the grooves 19 preferably terminate adjacent the bottom of the bell shaped member and the base of this member is preferably flared outwardly as at 20.

If desired and as a means for assisting in holding the article from slipping and as a means for holding the bell shaped member 15 in position, there may be provided a pin or projection 21 which is secured by one extremity to the apex of the conically shaped member 11.

This element 21 may be provided with a pointed extremity 22 and may be secured in position in any desired or suitable manner such as by means of one end thereof passing into the conically shaped portion 11 until a shoulder 23 on the element engages the portion 11. The end of the element 21 is then upset or riveted.

When the element 21 is employed, the knob or handle 17 is provided with an opening 17ª to receive the element 21, and the element 17 is of such a length that the extremity of the pointed end 22 of the element 21 will be maintained within the plane of the end of the knob or handle 17. This will protect the pointed end of the element 21 and prevent the hand of the operator from being injured.

In use and when the element 21 is employed, the bell shaped member 15 is removed. The article is placed over the conically shaped portion 11 so that the element 21 will pierce the skin. The bell shaped member is then placed in position over the article and the bell shaped member is grasped and rotated axially or oscillated with respect to the portion 11. At the same time, pressure is exerted upon the bell shaped member so as to press the article over the conical portion 11 and between such portion and the bell shaped member. This will extract all the juice and as the latter accumulates in the receptacle 13, it may be dumped therefrom through the spout 14.

While in the present form of the invention the conically shaped portion 11 and the bell shaped member 15 are each shown as being provided with grooves, such grooves are not necessary for the successful operation of this device, as the grooves may be entirely omitted or they may be provided in one of the article engaging faces and omitted from the other.

Likewise the element or pin 21 may be omitted but in that event and as before stated, the end of the bell shaped member will preferably be closed.

The parts of this improved device may be constructed of any material suitable for the purpose but are preferably constructed of some nonbreakable material or stamped from suitable sheet material.

It will be manifest that with this invention there is provided an improved device which is not only of a sanitary construction, but is effective and efficient in operation, and by means of the use of which juice may be expeditiously removed or extracted.

Obviously many other changes may be made in the details of construction and in the combination and arrangement of the several parts within the scope of the claims without departing from the spirit of this invention.

What is claimed as new is:

1. A juice extractor for lemons and the like embodying a member having an upwardly projecting conical portion, a pin secured at the apex of said portion and projecting therebeyond, a bell shaped member engaging over said conical portion, and a handle secured to the apex of the bell shaped member for rotating said bell shaped member, the said pin projecting through the apex of the bell shaped member, into and terminating within the said handle to be protected thereby, said pin serving to hold the bell shaped member in proper operative position with respect to the said conical portion.

2. A juice extractor for lemons and the like embodying a member having an upwardly projecting conical portion, a pin secured at the apex of said portion and projecting therebeyond, a bell shaped member engaging over said conical portion, and a handle secured to the apex of the bell shaped member for rotating said bell shaped member, the said pin projecting through the apex of the bell shaped member, into and terminating within the said handle to be protected thereby, said pin serving to hold the bell shaped member in proper operative position with respect to the said conical portion, the base of the bell shaped member being flared outwardly and the proximate faces of the said conical portion and the bell shaped member being undulated.

In testimony whereof I have signed my name to this specification, on this 30th day of August, A. D. 1924.

GEORGE WEISS.